United States Patent
Kadi et al.

(10) Patent No.: US 9,734,091 B2
(45) Date of Patent: Aug. 15, 2017

(54) REMOTE LOAD AND UPDATE CARD EMULATION SUPPORT

(71) Applicant: ACCENTURE GLOBAL SERVICES LIMITED, Dublin (IE)

(72) Inventors: Viresh Veerasangappa Kadi, Bijapur (IN); Veena Sudhakar Padiyar, Mumbai (IN); Manigandan Km, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 84 days.

(21) Appl. No.: 14/514,040

(22) Filed: Oct. 14, 2014

(65) Prior Publication Data

US 2016/0048460 A1 Feb. 18, 2016

(30) Foreign Application Priority Data

Aug. 16, 2014 (IN) .......................... 4006/CHE/2014

(51) Int. Cl.
| | |
|---|---|
| *G06F 21/00* | (2013.01) |
| *G06F 12/14* | (2006.01) |
| *H04W 12/06* | (2009.01) |
| *H04W 4/00* | (2009.01) |
| *H04W 12/04* | (2009.01) |

(52) U.S. Cl.
CPC ........ *G06F 12/1408* (2013.01); *H04W 4/008* (2013.01); *H04W 12/04* (2013.01); *H04W 12/06* (2013.01); *G06F 2212/1052* (2013.01)

(58) Field of Classification Search
CPC ........ G06F 12/1408; G06F 2212/1052; H04W 4/008; H04W 12/04; H04W 12/06
USPC ........................................... 713/193; 726/30
See application file for complete search history.

(56) References Cited

U.S. PATENT DOCUMENTS

| | | | | |
|---|---|---|---|---|
| 2003/0217270 | A1* | 11/2003 | Nakayama | ............... G06F 21/31 713/172 |
| 2005/0259816 | A1* | 11/2005 | Han | ................. G11B 20/00086 380/44 |
| 2006/0020821 | A1* | 1/2006 | Waltermann | ............ G06F 21/57 713/189 |
| 2006/0236107 | A1* | 10/2006 | Ishibashi | ............... H04L 9/0822 713/169 |
| 2013/0178159 | A1 | 7/2013 | Xie et al. | |

(Continued)

FOREIGN PATENT DOCUMENTS

EP 2690839 A1 1/2014

OTHER PUBLICATIONS

Mifare4mobile: "Specification, MIFARE4Mobile-Guidance Manual", Dec. 23, 2013, 66 pages. Retrieved from the Internet: URL:http://www.mifare4mobile.org/wp-content/uploads/2015/09/MIFARE4Mobile-Guidance.2.1.pdf.

(Continued)

*Primary Examiner* — Sarah Su
(74) *Attorney, Agent, or Firm* — Mannava & Kang, P.C.

(57) ABSTRACT

Remote load and update card emulation support may include providing emulation support for an emulated card by executing a command set from command sets that include an encrypted read write command set that uses a secure communication read write (SCRW) key, a plain read write command set that uses a plain communication read write (PCRW) key, and an encrypted read command set that uses a secure communication read only (SCR) key.

18 Claims, 17 Drawing Sheets

(56) References Cited

U.S. PATENT DOCUMENTS

| | | | |
|---|---|---|---|
| 2014/0053227 A1* | 2/2014 | Ruppin | G06F 21/10 726/1 |
| 2014/0254470 A1* | 9/2014 | Wendling | H04L 69/08 370/315 |
| 2015/0363599 A1* | 12/2015 | Hoyer | G06F 21/606 726/27 |
| 2016/0036814 A1* | 2/2016 | Conrad | H04L 63/0876 713/171 |

OTHER PUBLICATIONS

ISO: "Identification Cards—Integrated Circuit Cards—Part 4: Organization, Security and Commands for Interchange ISO/IEC 7816-411" International Standard ISO/IEC~ XX~ XX~ Jan. 5, 2005, 90 pages.

Hsu-Chen Cheng et al., "A secure and practical key management mechanism for NFC read-write mode", Advanced Communication Technology (ICACT), 2011 13th International Conference on, IEEE, Feb. 13, 2011, pp. 1095-1011.

The extended European search report, European Patent Application No. 15176096.4, European Patent Office, dated Nov. 16, 2015, 11 pages.

\* cited by examiner

Before Encryption

| X | Command Code | Command Data |||||
|---|---|---|---|---|---|---|
|   | Update Command | 1 | 2 | 3 | ............................ | n |

Encrypt the Command Data with the Session Key

| Y | Command Code | Encrypted Command Data |||||
|---|---|---|---|---|---|---|
|   | Update Command | 1' | 2' | 3' | ............................ | n' |

To ensure that the encrypted command data is not tampered in between, create a 32 byte Hash of ( X ) = Z =

| Hash Byte1 | Hash Byte2 | Hash Byte 3 | ............................Hash Byte 32 |
|---|---|---|---|

```
┌─────────────────────────────────────────┐
│ RECEIVE A SCRW KEY, A PCRW KEY, AND A SCR KEY │
│ THAT ARE SPECIFIC TO A DEVICE THAT EMULATES A │
│ CARD AND/OR A USER OF THE DEVICE        │
│ 702                                     │
└─────────────────────────────────────────┘
                    │
                    ▼
┌───────────────────────────────────────────────────────────────┐
│ USE THE SCRW KEY, THE PCRW KEY, OR THE SCR KEY TO PROVIDE EMULATION │
│ SUPPORT FOR THE EMULATED CARD BY EXECUTING A CORRESPONDING    │
│ COMMAND SET FROM COMMAND SETS THAT INCLUDE AN ENCRYPTED READ  │
│ WRITE COMMAND SET THAT USES THE SCRW KEY, A PLAIN READ WRITE  │
│ COMMAND SET THAT USES THE PCRW KEY, AND AN ENCRYPTED READ     │
│ COMMAND SET THAT USES THE SCR KEY                             │
│ 704                                                           │
└───────────────────────────────────────────────────────────────┘
```

REMOTE LOAD AND UPDATE CARD EMULATION SUPPORT

PRIORITY

The present application claims priority to Indian Patent Application number 4006/CHE/2014, having a filing date of Aug. 16, 2014, the disclosure of which is hereby incorporated by reference in its entirety.

BACKGROUND

Contactless transaction, payment, and tagging options typically include contactless cards and near field communication (NFC) tags. A contactless smart card is typically a pocket-sized card with embedded integrated circuits (ICs) that process and store data, and communicate with a terminal via radio waves. With respect to NFC tags, when a NFC-capable phone is placed near or tapped on a tag, the programmed action is undertaken. In the areas of contactless cards and NFC tags, host card emulation (HCE) is the presentation of a virtual and exact representation of a smart card using software.

BRIEF DESCRIPTION OF DRAWINGS

Features of the present disclosure are illustrated by way of examples shown in the following figures. In the following figures, like numerals indicate like elements, in which:

FIG. 3E illustrates creation of a hash of command data, according to an example of the present disclosure;

FIG. 7 illustrates a method for remote load and update card emulation support, according to an example of the present disclosure;

DETAILED DESCRIPTION

Figure 1:
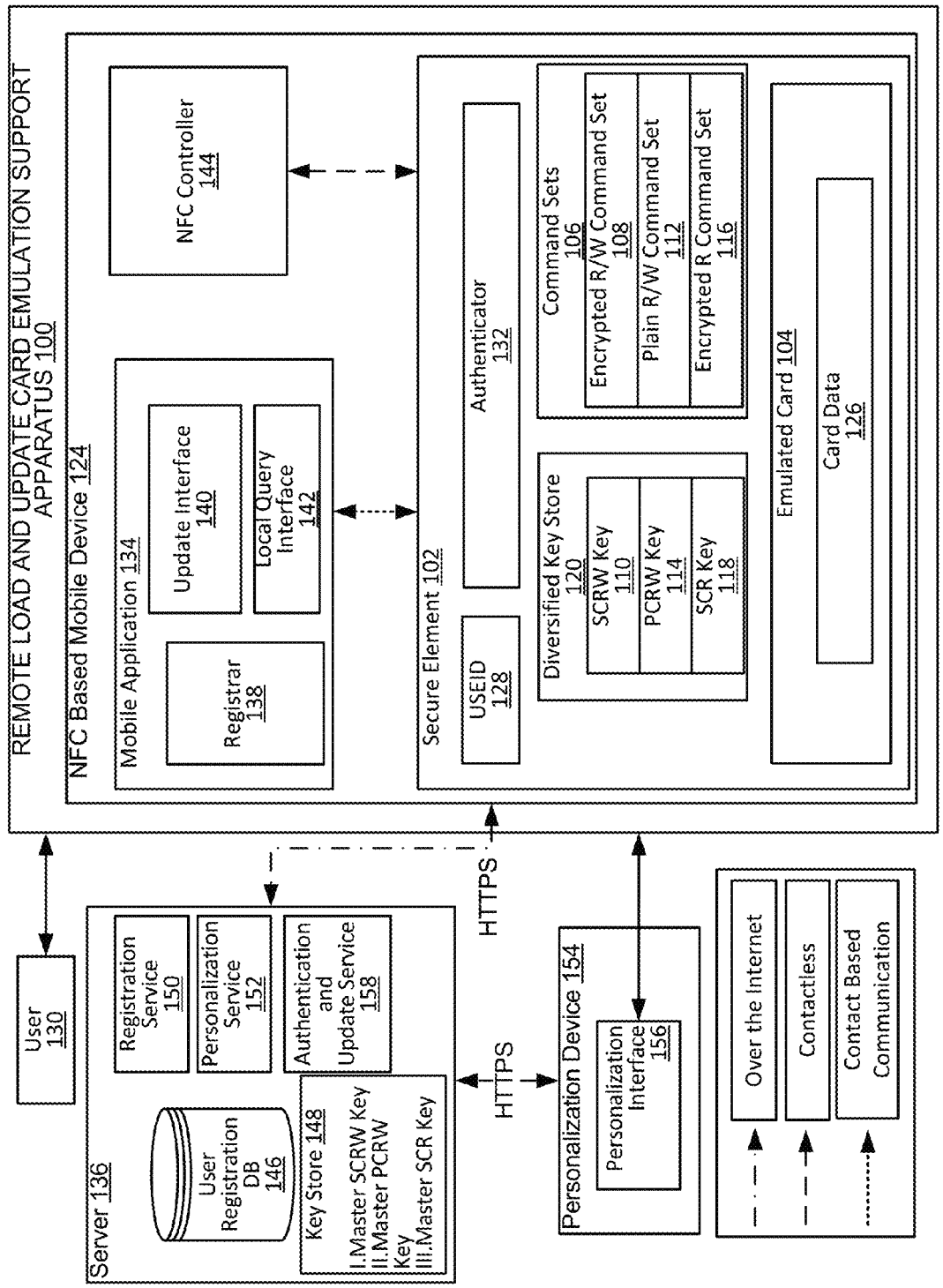
FIG. 1 illustrates a detailed architecture of a remote load and update card emulation support apparatus, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

NFC technology is used with mobile devices, such as mobile phones to emulate secure contactless cards. Emulation may be based on various types of communication including plain communication and encrypted communication. Plain communication includes unencrypted communication, for example, between a mobile device and a point of sale (PoS) device to implement a contactless communication. An example of the contactless communication includes a transit communication where the mobile device is placed near the PoS device to implement a transit operation. An example of a transit operation includes a commuter operation that provides for a user to swipe the mobile device adjacent the PoS device to enter a train terminal. A contactless communication may generally include a communication where there is no direct physical contact between a secure element that is implemented on the hardware of the mobile device and the PoS device (e.g., when the mobile device is tapped on a PoS device). Alternatively, a contact based communication may include a communication between an application such as a mobile application on the mobile device and the secure element of the mobile device. These different types of communication techniques are challenging to implement in a mobile device to provide for plain and encrypted communication with respect to an emulated card. For example, if plain communication is emulated, then the remote update of emulated card data may not be secure as the communication may be intercepted by an unauthorized entity. If encrypted communication is emulated, then the performance on PoS devices may become degraded.

In order to address at least the foregoing aspects related to implementation of different communication techniques in a mobile device with respect to an emulated card, according to examples disclosed herein, a remote load and update card emulation support apparatus and a method for remote load and update card emulation support are disclosed herein. According to an example, the remote load and update card emulation support apparatus may include at least one processor, and a secure element that is executed by the at least one processor to provide emulation support for an emulated card by executing at least one command set from command sets that include an encrypted read write command set that uses a secure communication read write (SCRW) key, a plain read write command set that uses a plain communication read write (PCRW) key, and an encrypted read command set that uses a secure communication read only (SCR) key. The secure element may utilize the encrypted read write command set to implement an update command related to the emulated card by using the SCRW key to authenticate the update command related to the emulated card. The secure element may utilize the plain read write command set to implement NFC based communication with a PoS device by using the PCRW key to authenticate the communication with the PoS device. The secure element may utilize the encrypted read command set to implement a read command related to the emulated card by using the SCR key to authenticate the read command related to the emulated card.

A user of the remote load and update card emulation support apparatus may download a mobile application for implementing, for example, update and local query functionality related to the emulated card. The user may register a unique username and password using the mobile application. A registration service on a server may facilitate the registration process to ensure the uniqueness of the user. For example, a username and password may be generated along with unique data that is stored in a user registration database of the server. The unique data may include, for example, the username, the password, a unique secure element identification (USEID) that is a random unique number generated and assigned against each user, a diversified SCRW key, a diversified PCRW key, and a SCR key. The SCRW and PCRW keys may be diversified by generating unique keys that are derived, for example, by using the USEID and a master key. Further, the SCR key may be generated, for example, by implementing an XOR operation on a hash of the username and a hash of the password.

The remote load and update card emulation support apparatus and the method for remote load and update card emulation support disclosed herein provide a technical solution to technical problems related, for example, to plain and encrypted communication with respect to an emulated card. The apparatus and method disclosed herein provide the technical solution of a secure element to provide emulation support for an emulated card by executing a command set from command sets that include an encrypted read write command set that uses a SCRW key, a plain read write command set that uses a PCRW key, and an encrypted read command set that uses a SCR key. The secure element may utilize the encrypted read write command set to implement an update command related to the emulated card by using the SCRW key to authenticate the update command related to the emulated card. The secure element may utilize the plain read write command set to implement NFC based communication with a PoS device by using the PCRW key to authenticate the communication with the PoS device. Further, the secure element may utilize the encrypted read command set to implement a read command related to the emulated card by using the SCR key to authenticate the read command related to the emulated card. The secure element thus provides for plain and encrypted communication with respect to an emulated card, without the performance degradation with respect to the encrypted communication. The apparatus and method disclosed herein further provide the technical solution of an authenticator to authenticate and/or control authentication of various operations related to the secure element. The authenticator thus limits unnecessary resource utilization or access to the secure element and the data related to the emulated card.

FIG. 1 illustrates a detailed architecture of a remote load and update card emulation support apparatus 100, according to an example of the present disclosure. The apparatus 100 may include a secure element 102 to provide emulation support for an emulated card 104 by executing a command set from command sets 106 that include an encrypted read write command set 108 that uses a SCRW key 110, a plain read write command set 112 that uses a PCRW key 114, and an encrypted read command set 116 that uses a SCR key 118. The SCRW key 110, PCRW key 114, and SCR key 118 may be maintained in a diversified key store 120 of the secure element 102.

The secure element 102 may utilize the encrypted read write command set 108 to implement, for example, an update command (e.g., top-up, or adding an additional monetary amount) related to the emulated card 104 by using the SCRW key 110 to authenticate the update command related to the emulated card 104. Upon authentication by the SCRW key 110, the command data for the encrypted read write command set 108 may be encrypted using the SCRW key 110.

The secure element 102 may utilize the plain read write command set 112 to implement NFC based communication (e.g., for use of the emulated card 104 for transit) with a PoS device 122 (see FIG. 4) by using the PCRW key 114 to authenticate the communication with the PoS device 122. In this regard, the plain read write command set 112 may be used for communication with the PoS device 122.

The secure element 102 may utilize the encrypted read command set 116 to implement a read command (e.g., balance check, or another query) related to the emulated card 104 by using the SCR key 118 to authenticate the read command related to the emulated card 104. In this regard, the encrypted read command set 116 may be performed locally on a mobile device 124.

The secure element 102 may be implemented on a board of the mobile device 124. Alternatively or additionally, the secure element 102 may be provided on a subscriber identity module (SIM) or a NFC card of the mobile device 124. Alternatively or additionally, the secure element 102 may be implemented as an applet.

According to an example, the apparatus 100 may be implemented in the mobile device 124. According to an example, the mobile device 124 may include a NFC based mobile phone, or a similar mobile device.

The emulated card 104 may include card data 126 that includes various details and information related to the emulated card 104. For example, the card data 126 may include information related to the balance on the emulated card 104, the currency type used by the emulated card 104, etc.

The secure element 102 may include a USEID 128 that is specific to a user 130 of the mobile device 124.

The secure element 102 may include an authenticator 132 that is to authenticate and/or control authentication of various operations related to the secure element 102 as described herein.

The user 130 of the apparatus 100 may download a mobile application 134 on the mobile device 124. The mobile application 134 is to provide for communication between external sources such as a server 136 and the secure element 102, and/or between the user 130 and the secure element 102. For example, the mobile application 134 is to provide for communication between the server 136 via the Internet for communication with respect to the SCRW key 110. The communication between the mobile application 134 and the secure element 102 may be designated as contact based communication. The mobile application 134 may include a registrar 138 that is to register a username and password for the user 130 with the server 136. The mobile application 134 may include an update interface 140 that is to implement over the air updates (e.g., addition of a monetary value) with respect to the emulated card 104. A local query interface 142 is to implement local queries (e.g., check balance) with respect to the emulated card 104.

Figure 4:
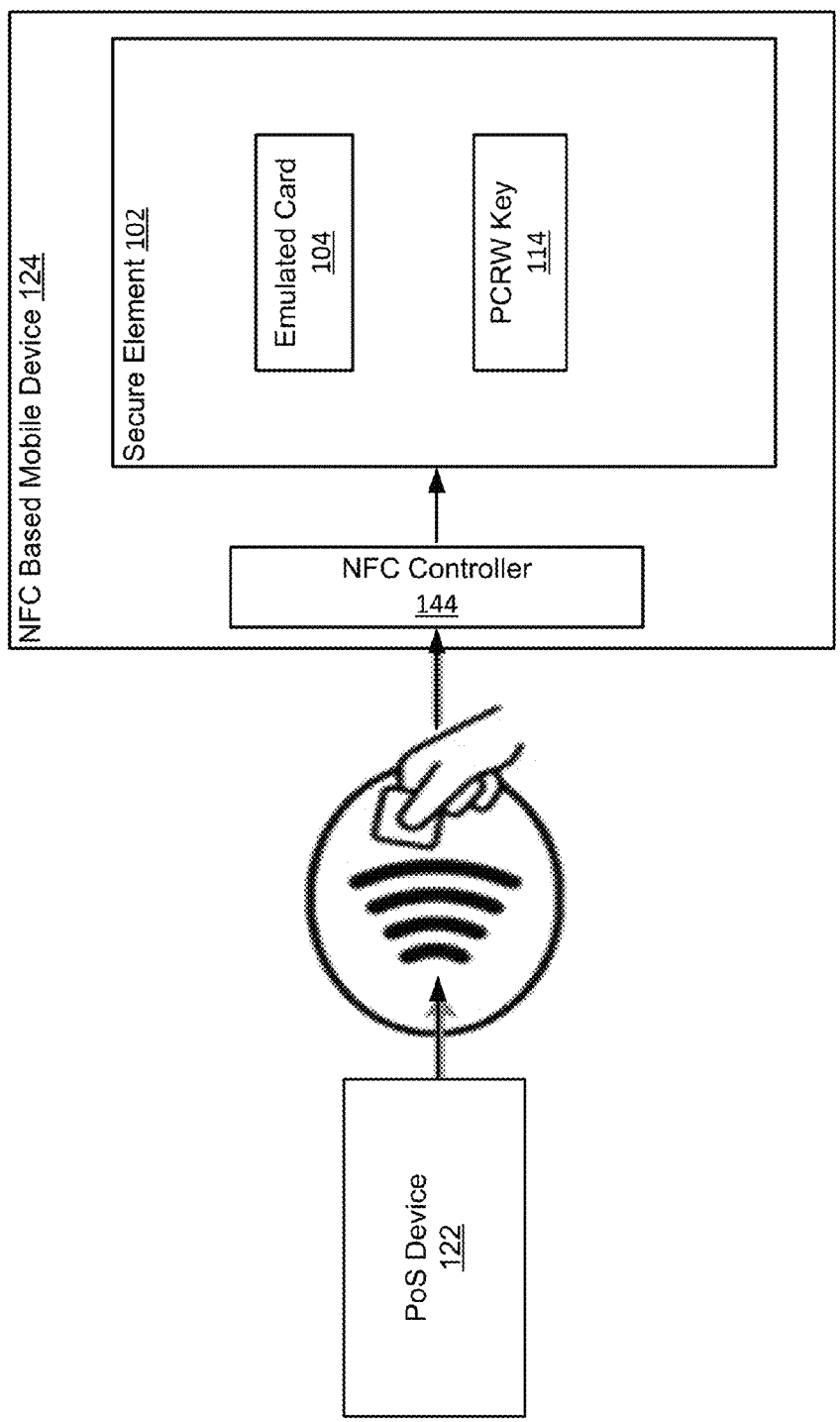
FIG. 4 illustrates point of sale (PoS) device interaction using a plain communication read write (PCRW) key, according to an example of the present disclosure.

A NFC controller 144 is to operate in conjunction with a NFC card to implement contactless communication with an external device, such as the PoS device 122 (see FIG. 4). For example, the NFC controller 144 may implement contactless communication between the PoS device 122 and the secure element 102.

The server 136 may include a user registration database 146 that includes details such as the user name, password, USEID 128, and associated master SCRW, PCRW, and SCR keys 148.

A registration service 150 of the server 136 is to facilitate registration of the mobile device 124 and the user 130 with the server 136.

A personalization service 152 is to operate in conjunction with a personalization device 154 that includes a personalization interface 156 to implement personalization of the mobile device 124 with respect to the specifics of the user 130.

An authentication and update service 158 is to operate in conjunction with the mobile application 134 and the secure element 102 to implement authentication and update of various commands (e.g., update, check balance, communicate with PoS device, etc.) by the user 130.

As described herein, the elements of the remote load and update card emulation support apparatus 100 may be machine readable instructions stored on a non-transitory computer readable medium. In addition, or alternatively, the elements of the remote load and update card emulation support apparatus 100 may be hardware or a combination of machine readable instructions and hardware.

Figure 2:
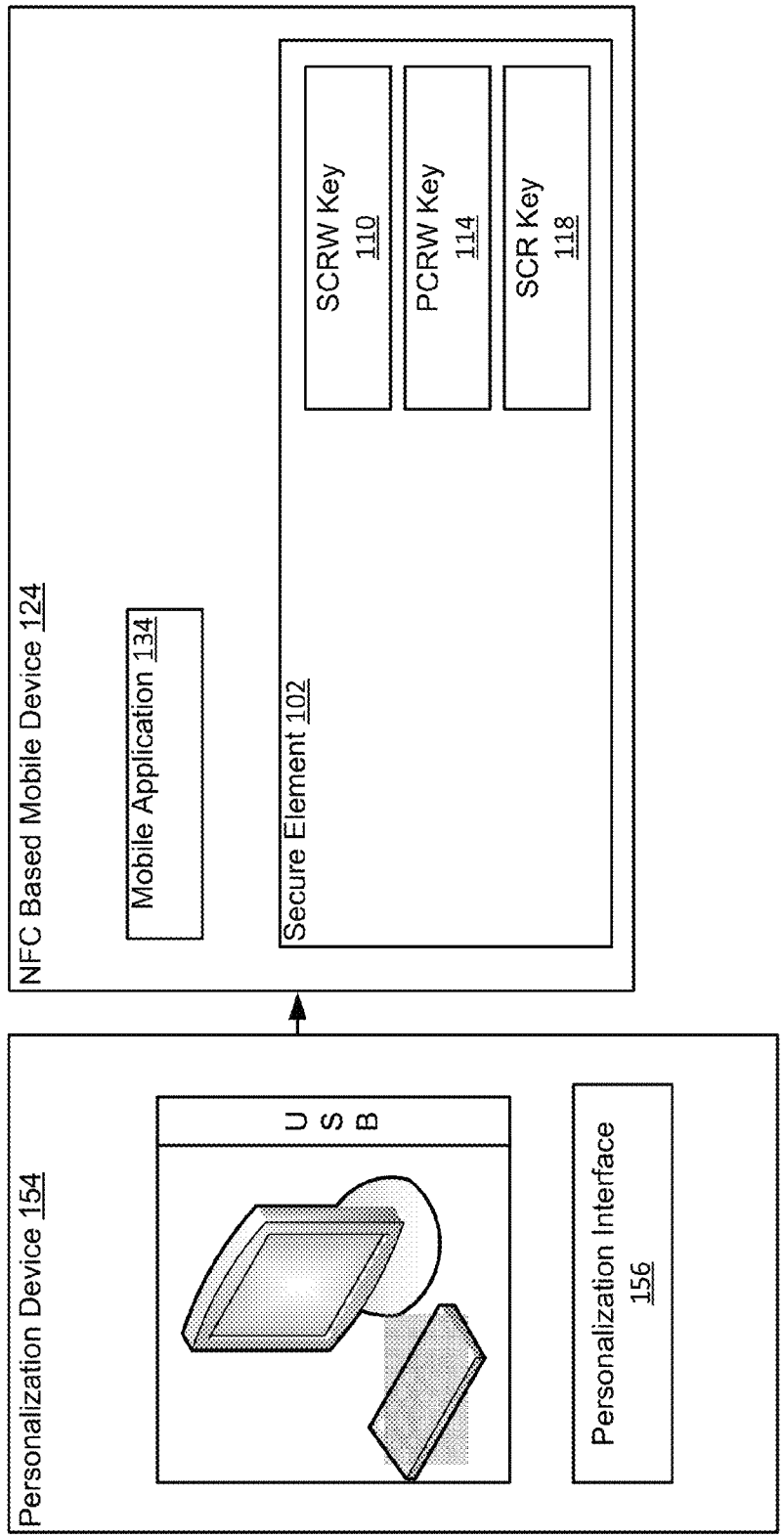
FIG. 2 illustrates a key loading process for the remote load and update card emulation support apparatus, according to an example of the present disclosure.

FIG. 2 illustrates a key loading process for the remote load and update card emulation support apparatus, according to an example of the present disclosure. With respect to personalization of the secure element 102 with the SCRW key 110, the PCRW key 114, and the SCR key 118, these keys may be loaded onto the secure element 102 that is used for communication with the personalization device 154. The SCRW key 110, the PCRW key 114, and the SCR key 118 may be unique for each mobile device 124. The personalization interface 156 may be used to perform personalization in a secure environment where the mobile device 124 is to be connected to the personalization device 154 for loading of the keys. The personalization device 154 may retrieve the appropriate SCRW key 110, the PCRW key 114, and the SCR key 118 based on the USEID 128 from the server 136.

Figure 3A:
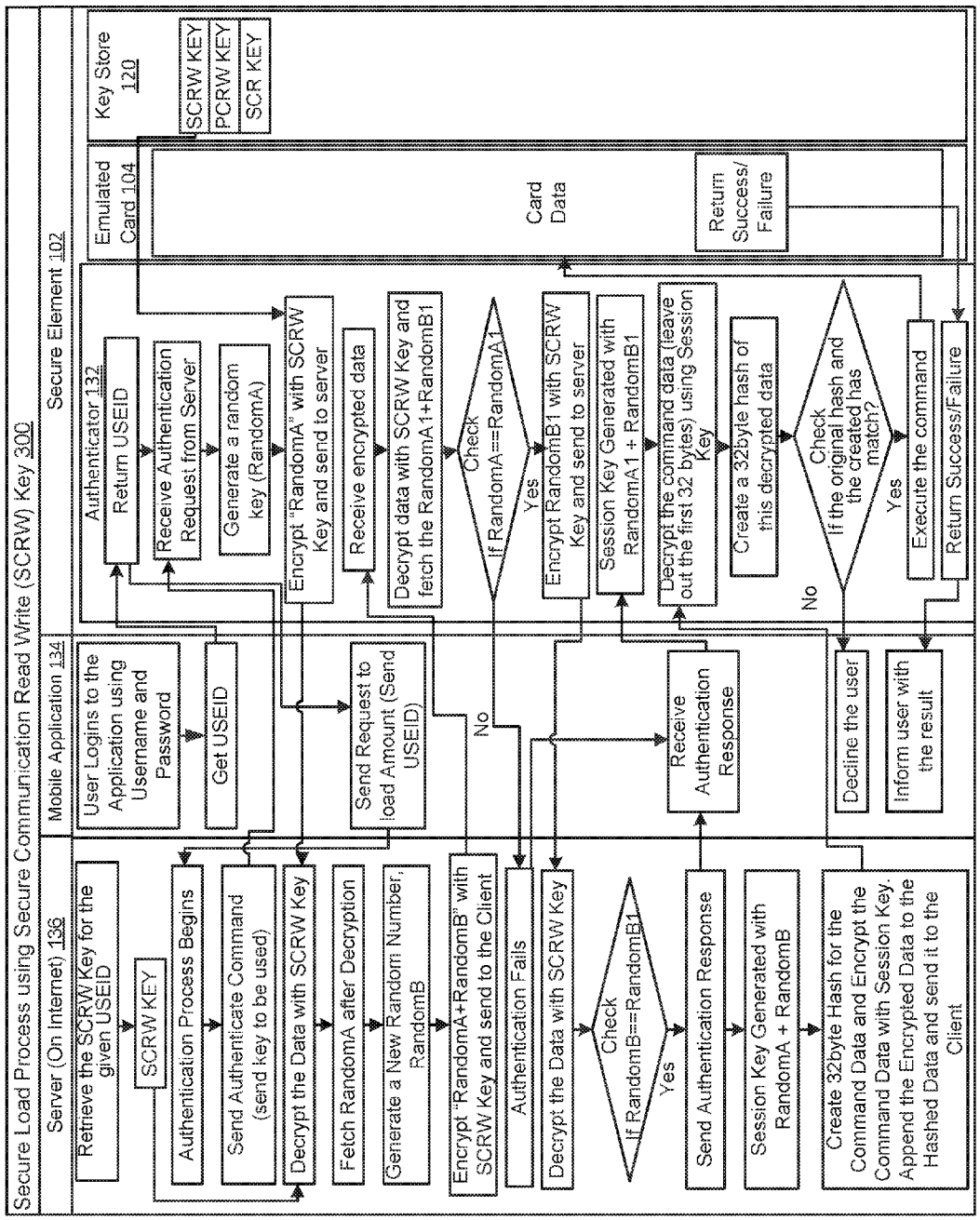
FIG. 3A illustrates a secure load process using a secure communication read write (SCRW) key, according to an example of the present disclosure.
Figure 3B:
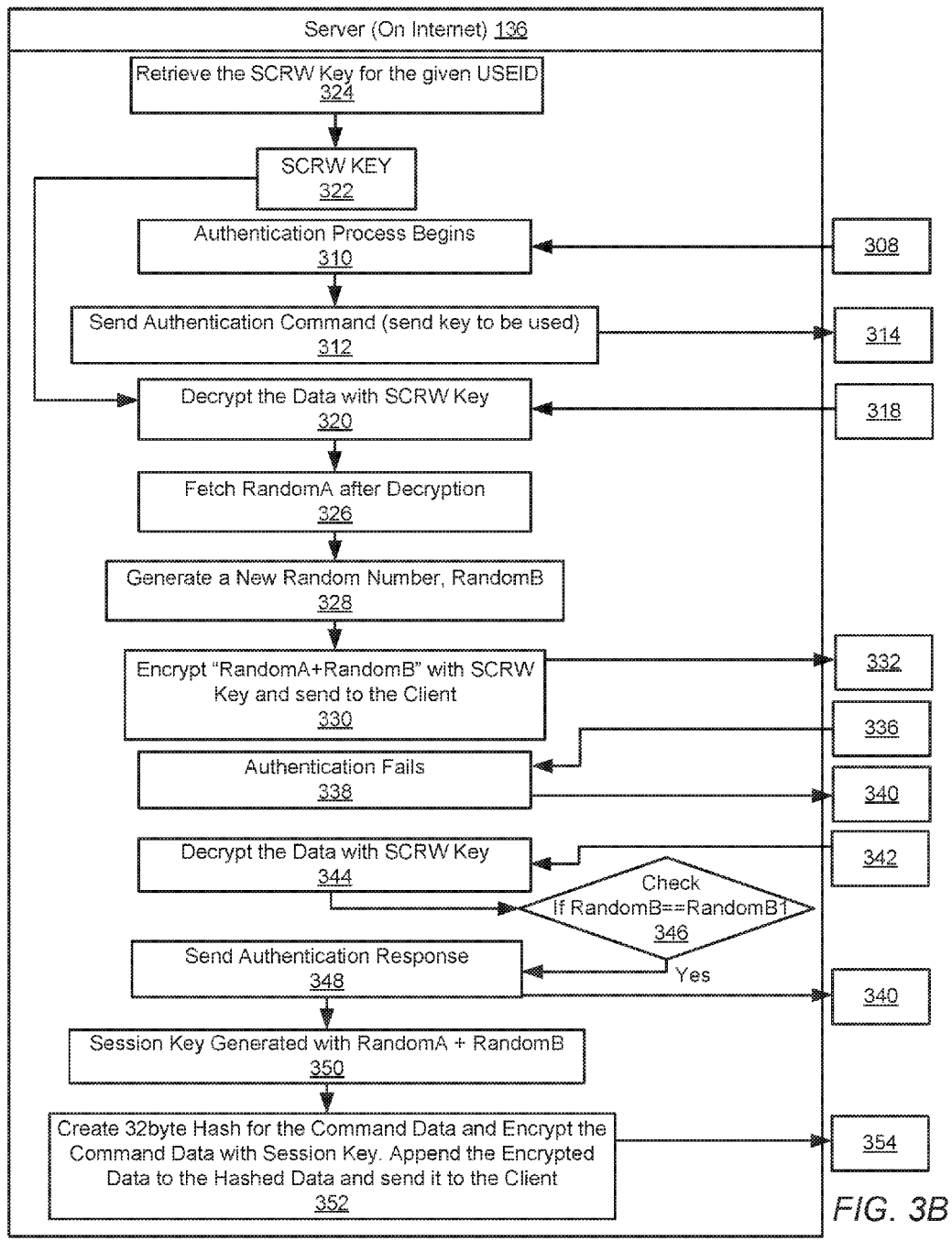
FIGS. 3B-3D illustrate expanded views of the secure load process of FIG. 3A using the SCRW key, according to an example of the present disclosure.
Figure 3C:
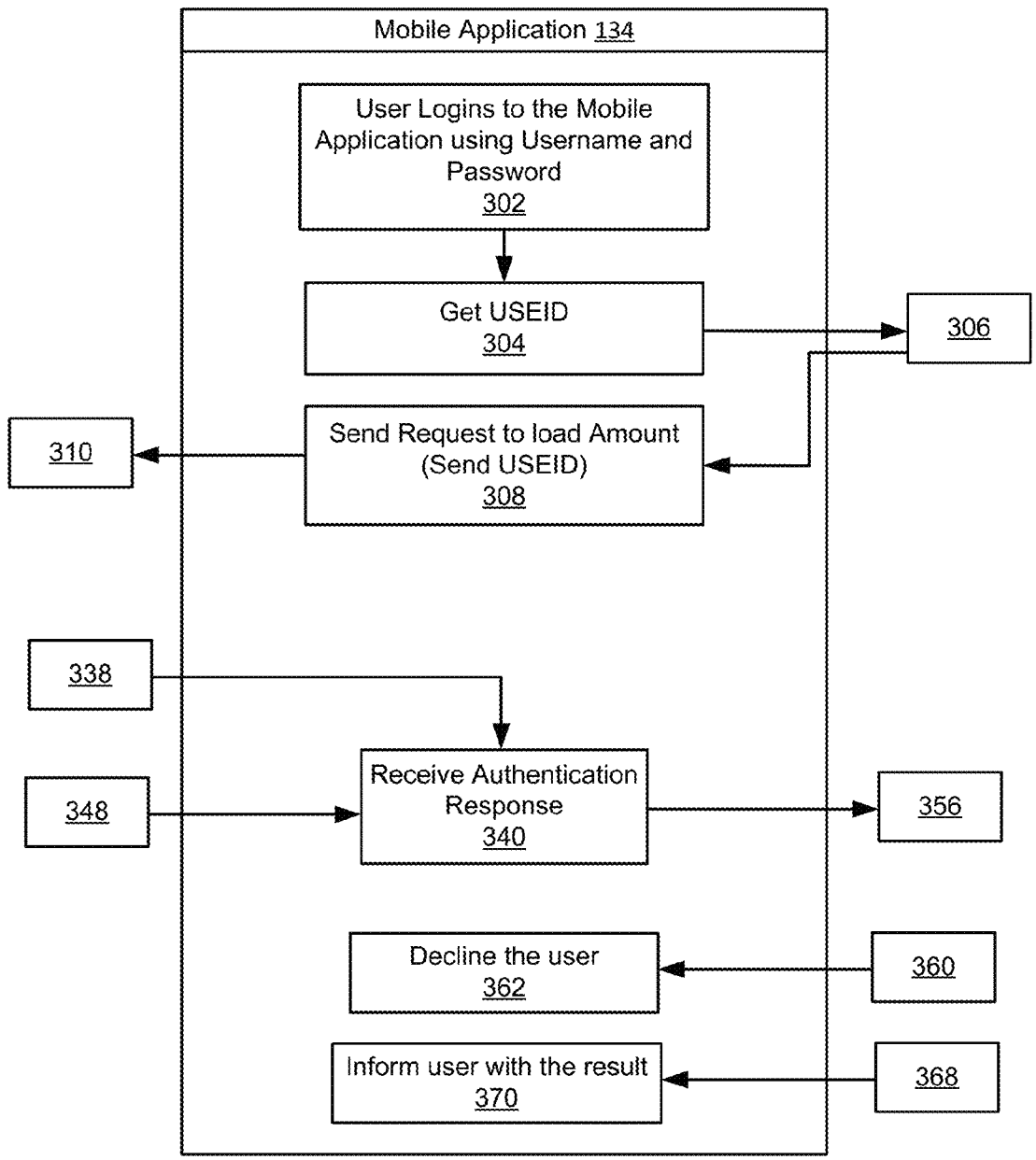
Figure 3D:
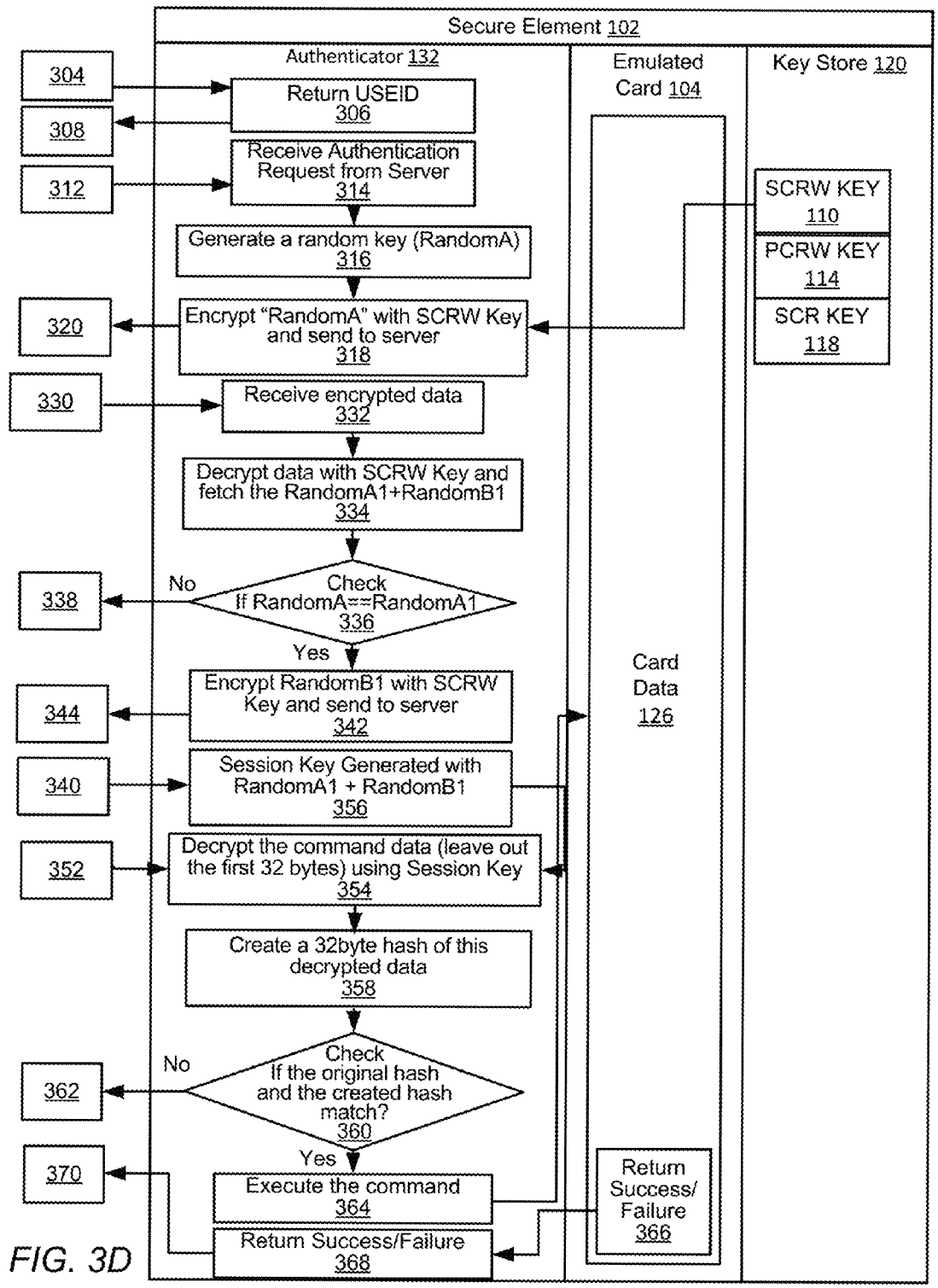

FIG. 3A illustrates a secure load process 300 using the SCRW key 110, according to an example of the present disclosure. FIGS. 3B-3D illustrate expanded views of the secure load process of FIG. 3A using the SCRW key 110, according to an example of the present disclosure.

Referring to FIGS. 3A-3D, at block 302, the user 130 may login to the mobile application 134 using the user's username and password.

At block 304, the mobile application 134 may retrieve the USEID 128 associated with the username and password, and forward the USEID 128 to the authenticator 132 of the secure element 102.

At block 306, the authenticator 132 may authenticate and return the USEID 128 to the mobile application 134.

At block 308, the user 130, via the mobile application 134, may send a request to load a predetermined amount (e.g., dollar or other currency value) to the emulated card 104.

At block 310, the authentication process for loading of the predetermined amount to the emulated card 104 may begin at the server 136.

At block 312, the server 136 may send an authentication command, which is received by the authenticator 132 at block 314.

At block 316, the authenticator 132 may generate a random key (e.g., RandomA).

At block 318, the authenticator 132 may encrypt the random key (e.g., RandomA) with the SCRW key 110, and send the encrypted random key to the server 136.

At block 320, the random key (e.g., RandomA) encrypted with the SCRW key 110 may be decrypted with the SCRW key 322 for the given USEID 128 that is retrieved by the server 136 at block 324.

At block 326, the random key (e.g., RandomA) may be fetched after decryption at block 320.

At block 328, a new random number (e.g., RandomB) may be generated at the server 136.

At block 330, the random key (e.g., RandomA) and the new random number (e.g., RandomB) may be encrypted with the SCRW key 322 and sent to the authenticator 132, which receives the encrypted data at block 332.

At block 334, the authenticator 132 may decrypt the encrypted random key (e.g., RandomA) and the new random number (e.g., RandomB) with the SCRW key 110 (i.e., to fetch RandomA1+RandomB1).

At block 336, a determination may be made as to whether the random key (e.g., RandomA) is equal to RandomA1. The determination at block 336 may be used to effectively confirm that the server 136 is an authorized server.

In response to a determination that the random key (e.g., RandomA) is not equal to RandomA1, at block 338, the failed authentication may be reported to the server 136.

Further to the failed authentication that is reported to the server 136 at block 338, at block 340, a failed authentication response may be received by the mobile application 134. The failed authentication response may be reported to the user 130.

In response to a determination that the random key (e.g., RandomA) is equal to RandomA1, at block 342, RandomB1 may be encrypted with the SCRW key 110 and sent to the server 136.

At block 344, the RandomB1 that is encrypted with the SCRW key 110 may be decrypted with the SCRW key 322 at the server 136.

At block 346, a determination is made as to whether RandomB is equal to RandomB1. The determination at block 346 may be used to effectively confirm that the mobile device 124 is an authorized mobile device (i.e., a mobile device that has been personalized for the specific user 130).

In response to a determination that RandomB is equal to RandomB1, at block 348, an authentication response may be sent to the mobile application 134. The authentication response may be received by the mobile application 134 at block 340, and reported to the user 130.

At block 350, a session key may be generated at the server 136 based on RandomA and RandomB.

At block 352, a hash for the command data for the encrypted read write command set 108 may be generated at the server 136, and the command data may be encrypted with the session key generated at block 350. The encrypted command data may be appended to the hashed data, and sent to the secure element 102. For example, referring to FIG. 3E, an example of a command code for the encrypted read write command set 108 is represented by X (i.e., the command code before encryption at block 352). The encrypted command data with the session key from block 350 is represented by Y. In order to ensure that the encrypted command data is not tampered with, a 32 byte hash may be created for the hash of X, and represented as Z. The encrypted command data that is appended to the hashed data, and sent to the secure element 102 may be represented as Y+Z (i.e., append Z to Y).

At block 354, the authenticator 132 may decrypt the command data using the session key generated at block 356 (i.e., session key based on RandomA1 and RandomB1). The first 32 bytes of the encrypted read write command set 108 may be removed. For example, referring to FIG. 3E, Y+Z that is sent to the secure element 102 may be received at block 354. The last 32 bytes (i.e., Z and Y remain) may be removed. Further, Y may be decrypted with the session key from block 356 to obtain X.

At block 358, the authenticator 132 may generate a hash of the decrypted command data from block 354. For example, the authenticator 132 may generate a 32 byte hash of the decrypted command data from block 354. For the example of FIG. 3E, the authenticator 132 may generate a 32 byte hash of X obtained at block 354.

At block 360, the authenticator 132 may determine whether the original hash (i.e., from block 352) and the created hash (i.e., from block 358) match. For the example of FIG. 3E, the authenticator 132 may determine whether the hash of X from block 358 matches the value of Z from block 352. The determination at block 360 may be used to effectively confirm that the command data has not been compromised after authentication of the request at block 308, and further the secure element 102 and the server 136.

In response to a determination that the original hash (i.e., from block 352) does not match the created hash (i.e., from block 358), at block 362, the original request at block 308 by the user 130 may be declined.

In response to a determination that the original hash (i.e., from block 352) matches the created hash (i.e., from block 358), at block 364, the original request at block 308 by the user 130 may be executed at the emulated card 104.

A success or failure notification with respect to the execution of the original request at block 308 may be returned from the emulated card 104 at block 366.

At block 368, the authenticator 132 may receive the success or failure notification from the emulated card 104 from block 366.

At block 370, the mobile application 134 may receive the success or failure notification from the authenticator 132 at block 368, and notify the user 130 of the successful (or unsuccessful) execution of the original request at block 308.

FIG. 4 illustrates PoS device interaction using the PCRW key 114, according to an example of the present disclosure. The PoS device interaction using the PCRW key 114 may include using the mobile device 124 which includes the secure element 102 including the emulated card 104, and the PCRW key 114 to access the emulated card 104. When the mobile device 124 is placed, for example, in front of a PoS device 122, the emulated card 104 may be used (i.e., in place of an actual physical card for processing a transaction). The communication between PoS device 122 and mobile device 124 may be implemented via the NFC controller 144. The NFC controller 144 may communicate with the secure element 102 to thus make the communication channel between the PoS device 122 and mobile device 124 secure.

Figure 5A:
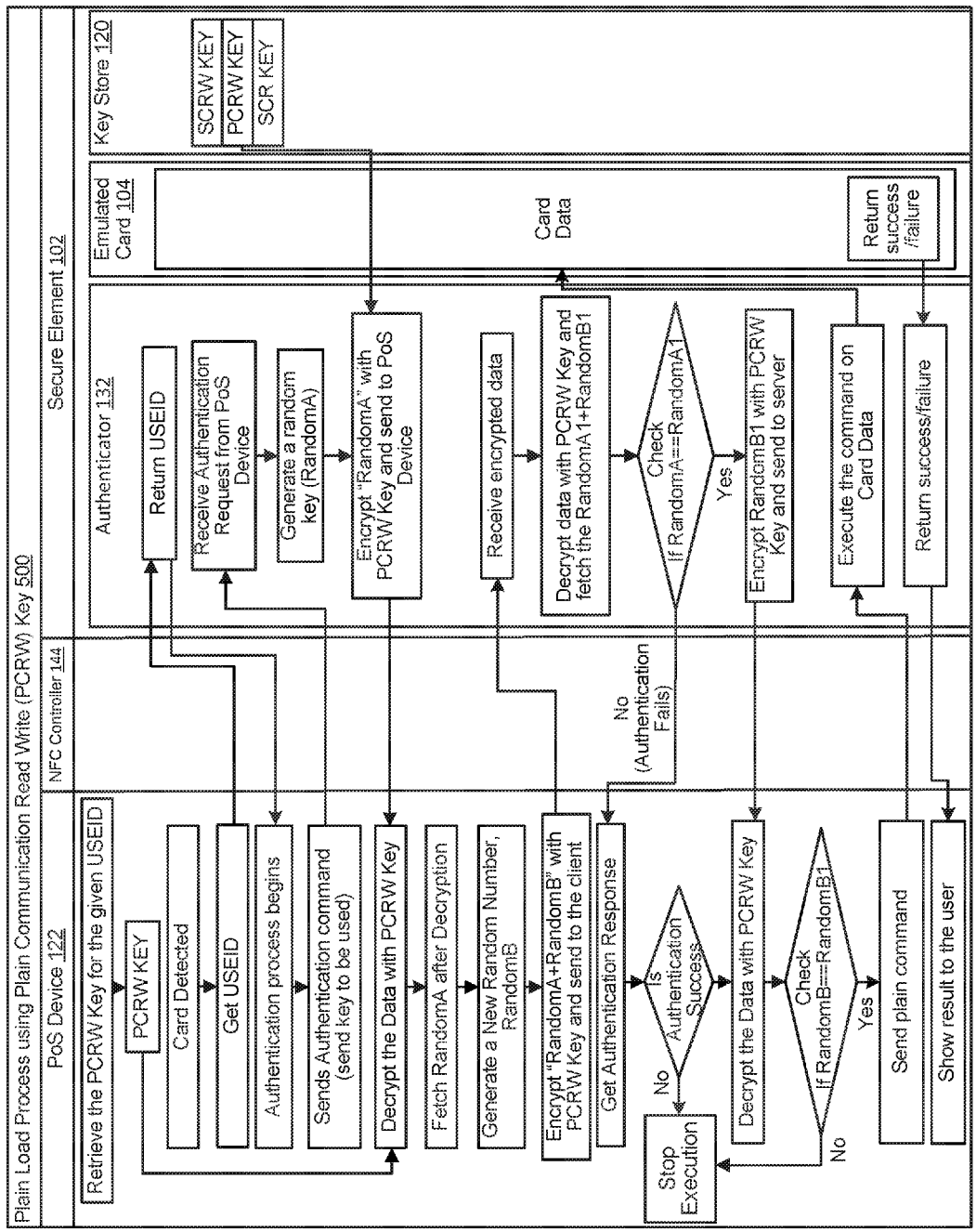
FIG. 5A illustrates a plain load process using the PCRW key, according to an example of the present disclosure.
Figure 5B:
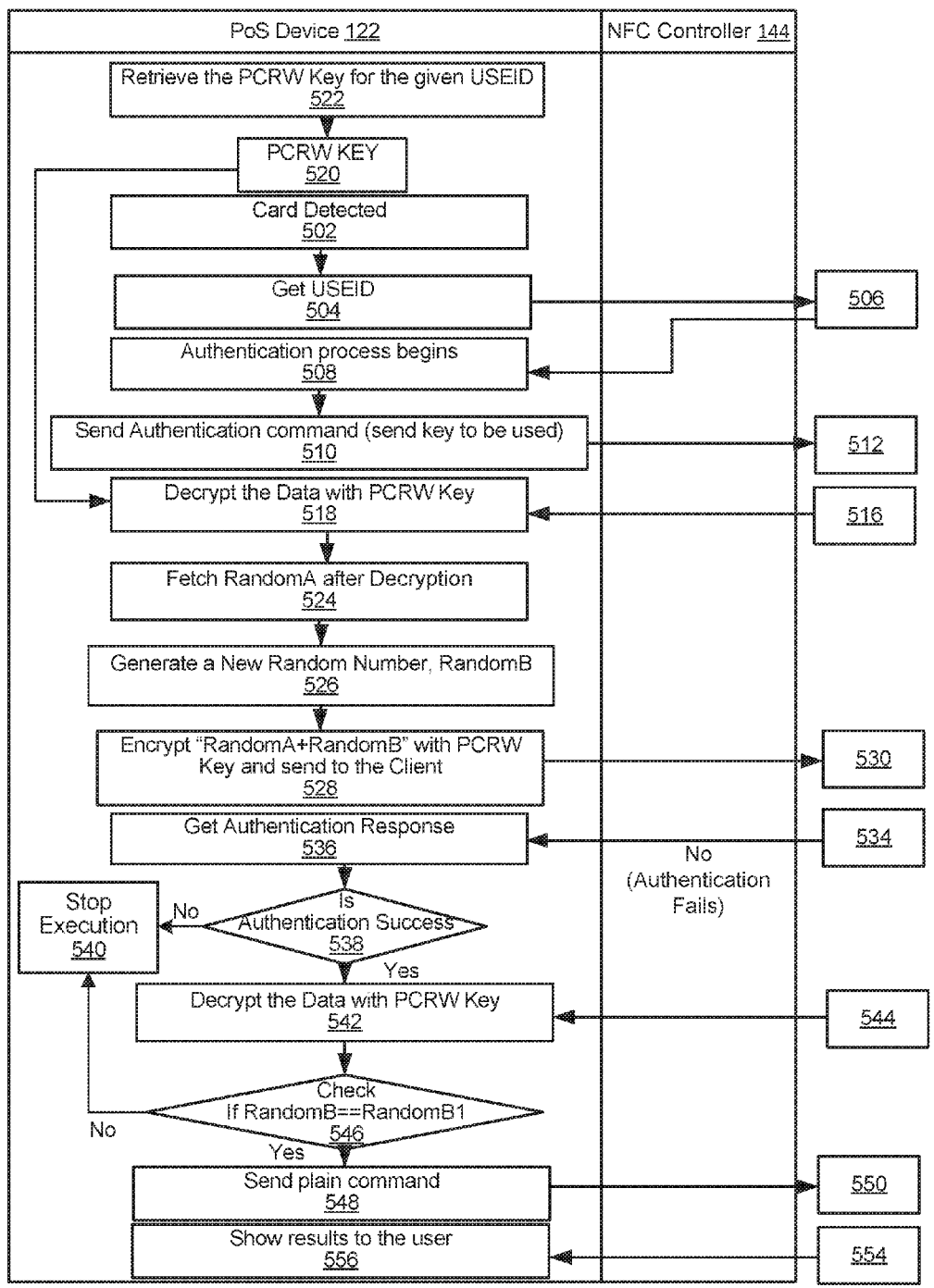
FIGS. 5B and 5C illustrate expanded views of the plain load process of FIG. 5A using the PCRW key, according to an example of the present disclosure.
Figure 5C:
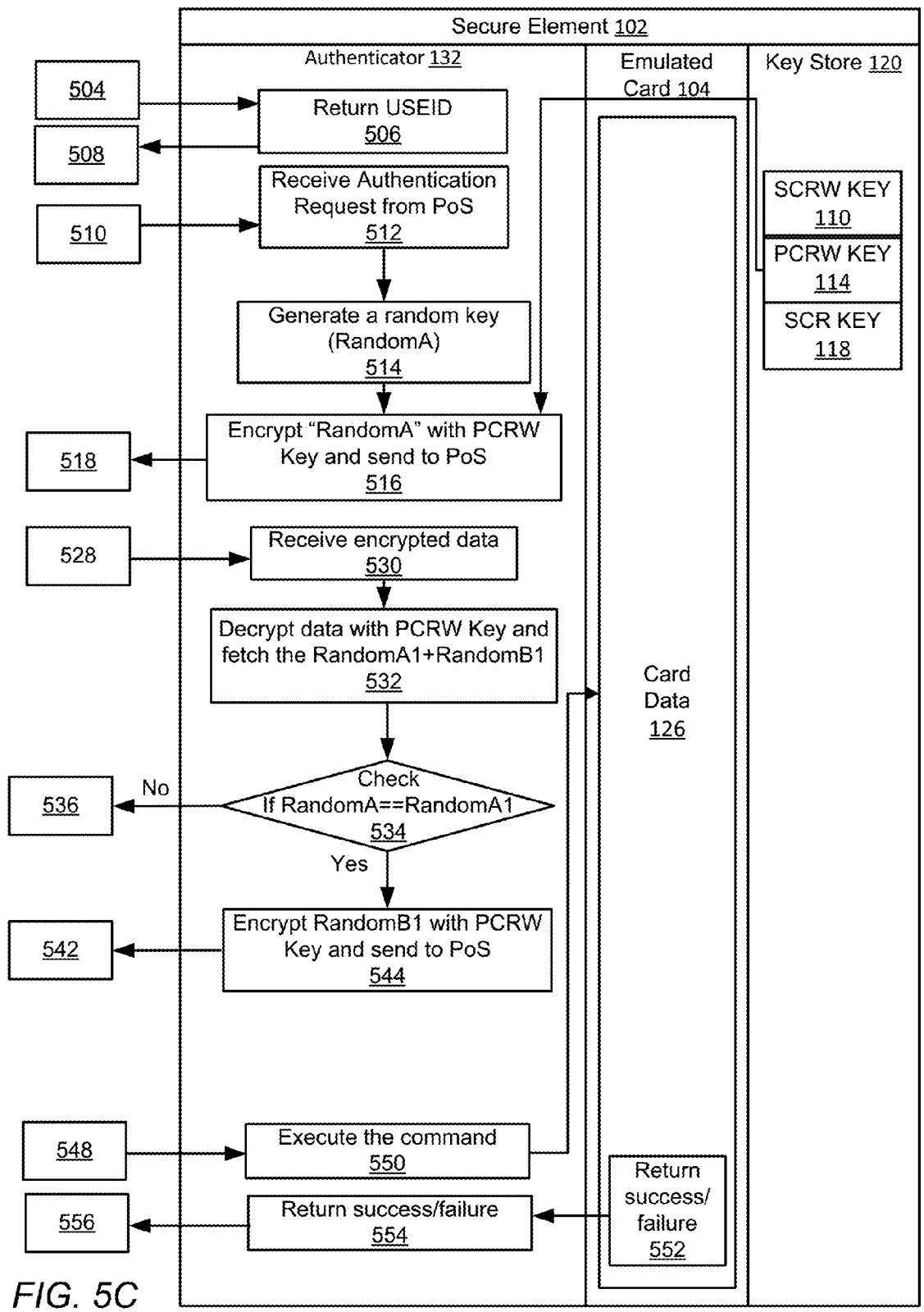

FIG. 5A illustrates a plain load process 500 using the PCRW key 114, according to an example of the present disclosure. FIGS. 5B and 5C illustrate expanded views of the plain load process of FIG. 5A using the PCRW key 114, according to an example of the present disclosure.

Referring to FIGS. 5A-5C, at block 502, the emulated card 104 may be detected at the PoS device 122.

At block 504, the PoS device 122 may request retrieval of the USEID 128 related to the emulated card 104.

At block 506, the authenticator 132 may receive the USEID 128 request from the PoS device 122, and return the USEID 128 to the PoS device 122.

At block 508, the authentication process for the emulated card 104 may begin at the PoS device 122.

At block 510, the PoS device 122 may send the authentication command with the key to be used to the authenticator 132, which receives the authentication command at block 512.

At block 514, the authenticator 132 may generate a random key (e.g., RandomA).

At block 516, the authenticator 132 may encrypt the random key (e.g., RandomA) with the PCRW key 114, and send the encrypted random key to the PoS device 122.

At block 518, the PoS device 122 may decrypt the encrypted random key with the PCRW key 520 that is retrieved at block 522 by the PoS device 122 for the given USEID 128.

At block 524, the PoS device 122 may fetch the random key (e.g., RandomA) based on the decryption at block 518.

At block 526, the PoS device 122 may generate a new random number (e.g., RandomB).

At block 528, the PoS device 122 may encrypt the random key (e.g., RandomA) and the new random number (e.g., RandomB) with the PCRW key 520, and send the encrypted random key and new random number to the authenticator 132.

At block 530, the authenticator 132 may receive the encrypted random key and new random number from the PoS device 122.

At block 532, the authenticator 132 may decrypt the encrypted random key and new random number from the PoS device 122, and fetch RandomA1 and RandomB1.

At block 534, the authenticator 132 may determine whether RandomA is equal to RandomA1. The determination at block 534 may be used to effectively confirm that the PoS device 122 is an authorized PoS device.

In response to a determination that RandomA is not equal to RandomA1, at block 536, the authentication failure may be received by the PoS device 122.

At block 538, a determination is made as to whether authentication is successful.

In response to a determination that the authentication is not successful, at block 540, further execution related to the plain load process may be stopped.

In response to a determination that the authentication is successful, at block 542, the encrypted RandomB1 with the PCRW key 114 may be decrypted. The encrypted RandomB1 with the PCRW key 114 may be received from block 544, which is based on a determination that RandomA is equal to RandomA1 at block 534.

At block 546, a determination may be made as to whether RandomB is equal to RandomB1. The determination at block 546 may be used to effectively confirm that the mobile device 124 is an authorized mobile device (i.e., a mobile device that has been personalized for the specific user 130).

In response to a determination that RandomB is not equal to RandomB1, at block 540, further execution related to the plain load process may be stopped.

In response to a determination that RandomB is equal to RandomB1, at block 548, the command to execute the transaction may be sent to the authenticator 132 that executes the transaction at block 550. The authenticator 132 may keep track of the type of key used for authentication (e.g., SCRW, PCRW, or SCR), and accordingly manage the further communication once authenticated.

A success or failure notification with respect to the execution of the original communication at block 502 may be returned from the emulated card 104 at block 552.

At block 554, the authenticator 132 may receive the success or failure notification from the emulated card 104 from block 552.

At block 556, the PoS device 122 may receive the success or failure notification from the authenticator 132 at block 554, and notify the user 130 of the successful (or unsuccessful) communication and further processing results (not shown) related to the PoS device 122.

Figure 6A:
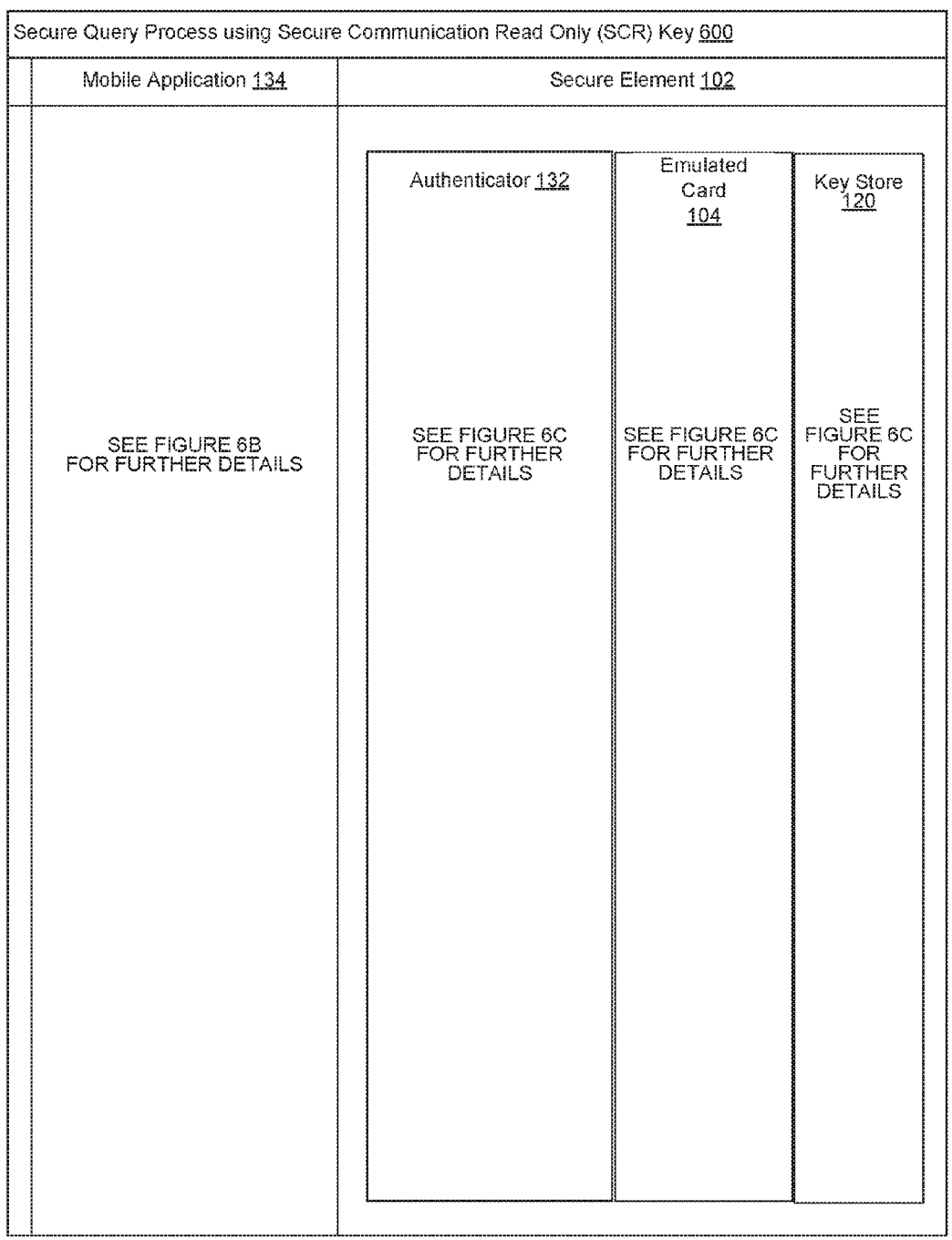
FIG. 6A illustrates a secure query process using a secure communication read only (SCR) key, according to an example of the present disclosure.
Figure 6B:
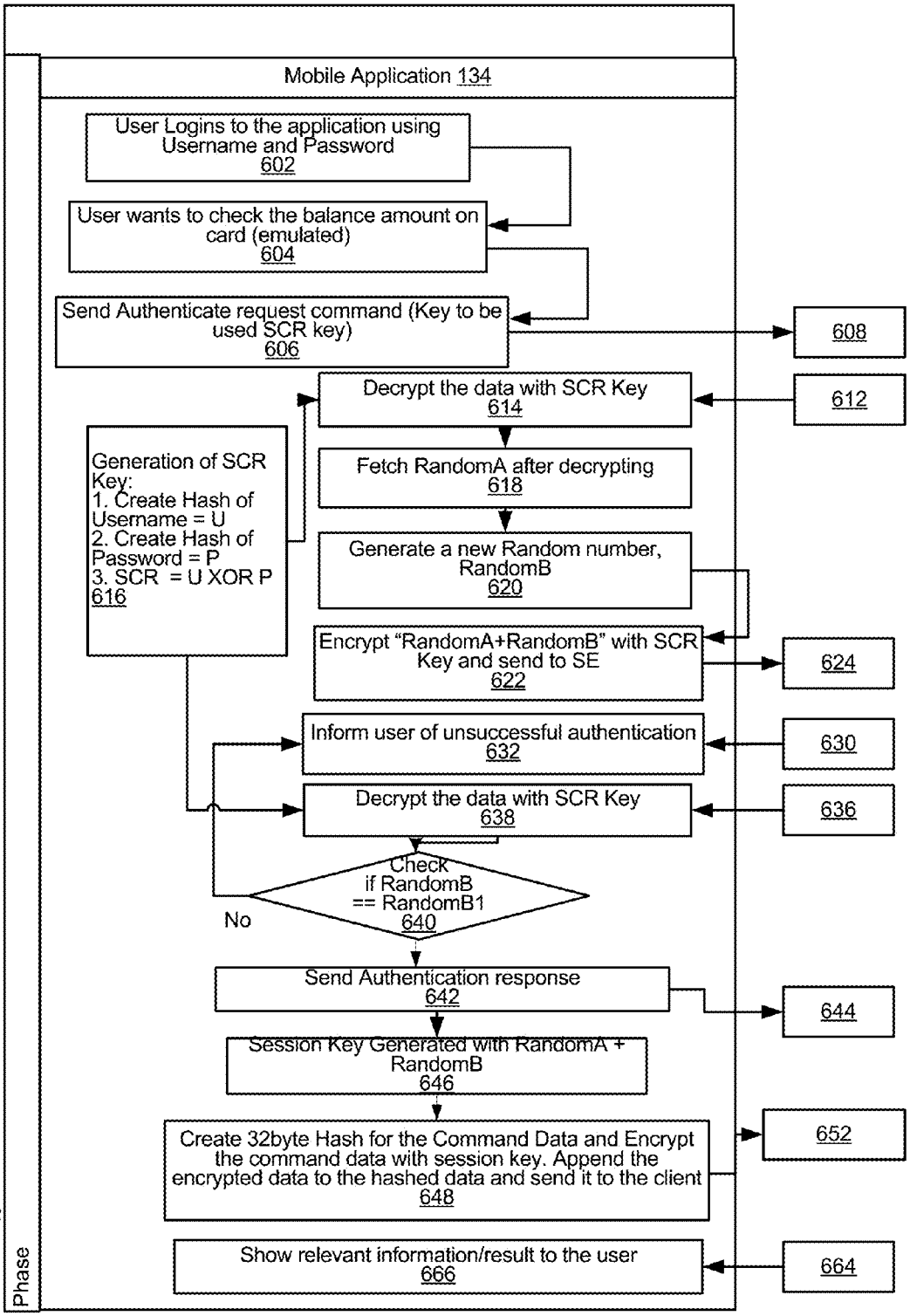
FIGS. 6B and 6C illustrate expanded views of the secure query process of FIG. 6A using the SCR key, according to an example of the present disclosure.
Figure 6C:
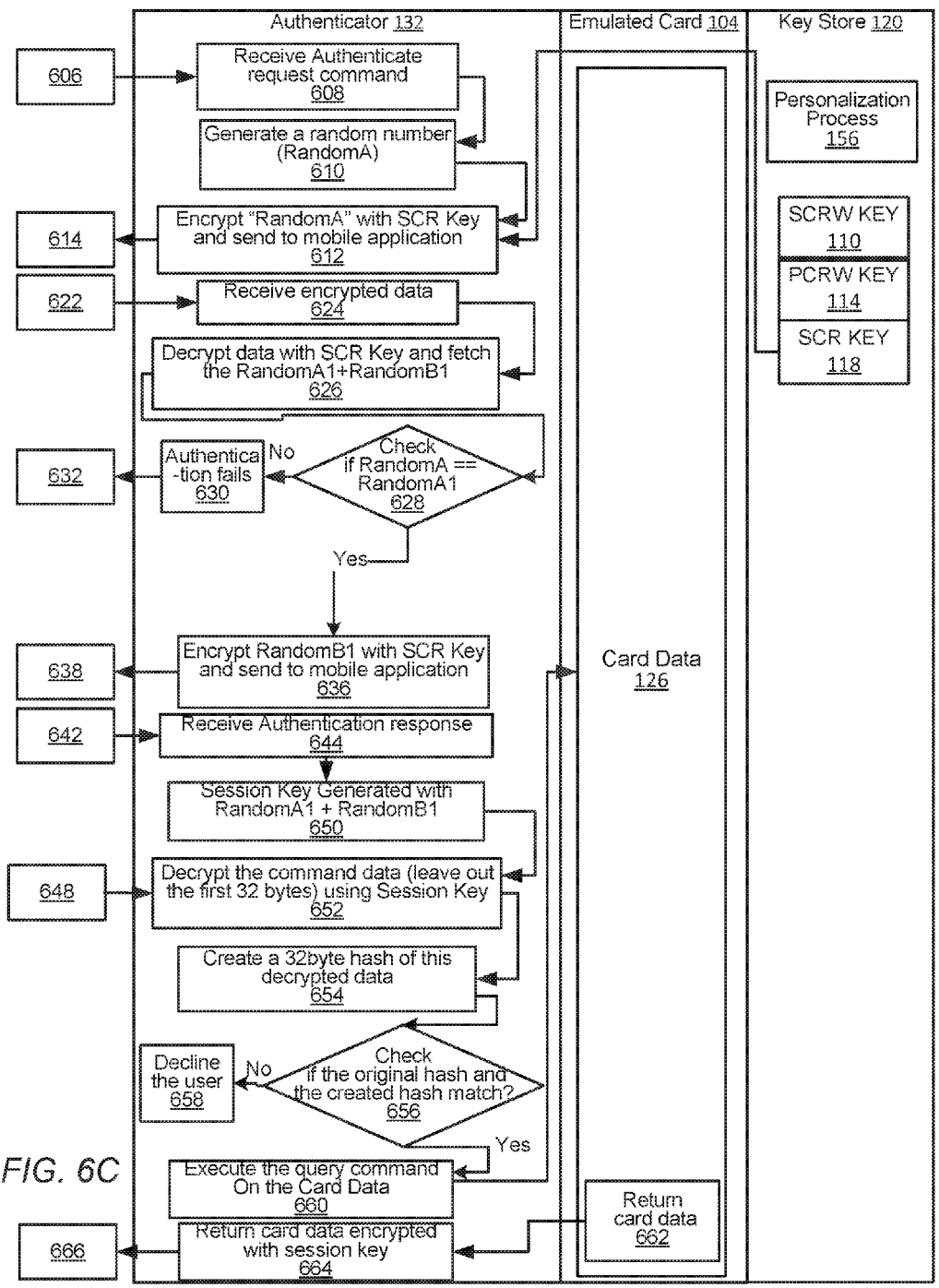

FIG. 6A illustrates a secure query process 600 using the SCR key 118, according to an example of the present disclosure. FIGS. 6B and 6C illustrate expanded views of the secure query process of FIG. 6A using the SCR key 118, according to an example of the present disclosure.

Referring to FIGS. 6A-6C, at block 602, the user 130 may login to the mobile application 134 using the username and password.

At block 604, the user 130 may enter an inquiry for the emulated card 104. For example, the user 130 may enter a balance amount check request for the emulated card 104.

At block 606, the mobile application 134 may send an authenticate request commend to the authenticator 132 of the secure element 102, which receives the authenticate request command at block 608.

At block 610, the authenticator 132 may generate a random number (e.g., RandomA).

At block 612, the authenticator 132 may encrypt the random number (e.g., RandomA) with the SCR key 118, and send the encrypted random number to the mobile application 134.

At block 614, the mobile application 134 may decrypt the encrypted random number with a mobile application based SCR key that is fetched from block 616.

At block 616, with respect to generation of the mobile application based SCR key, the mobile application based SCR key may be generated based on an XOR operation performed on a hash of the username and password for the user 130.

At block 618, the mobile application 134 may fetch RandomA from the decrypted random number with the mobile application based SCR key.

At block 620, the mobile application 134 may generate a new random number (e.g., RandomB).

At block 622, the random number (e.g., RandomA) and the new random number (e.g., RandomB) may be encrypted with the mobile application based SCR key, and sent to the authenticator 132, which receives the encrypted random number and the new random number at block 624.

At block 626, the authenticator 132 may decrypt the encrypted random number (e.g., RandomA) and the new random number (e.g., RandomB) with the SCR key 118 to fetch RandomA1 and RandomB1.

At block 628, the authenticator 132 may determine whether the random number (e.g., RandomA) is equal to RandomA1. The determination at block 628 may be used to effectively confirm that the mobile application 134 is an authorized mobile application.

In response to a determination that the random number (e.g., RandomA) is not equal to RandomA1, at block 630, the authenticator 132 may generate an authentication fail notification.

At block 632, the mobile application 134 may inform the user 130 of the unsuccessful authentication.

In response to a determination that the random number (e.g., RandomA) is equal to RandomA1, at block 636, the authenticator 132 may encrypt RandomB1 with the SCR key 118, and forward the encrypted RandomB1 to the mobile application 134.

At block 638, the mobile application 134 may decrypt the encrypted RandomB1 with the mobile application based SCR key that is fetched from block 616.

At block 640, the mobile application 134 may determine whether the RandomB is equal to RandomB1. The determination at block 640 may be used to effectively confirm that the secure element 102 is an authorized secure element (i.e., a secure element that has been personalized for the specific user 130).

In response to a determination that RandomB is not equal to RandomB1, at block 632, the mobile application 134 may inform the user 130 of the unsuccessful authentication.

In response to a determination that RandomB is equal to RandomB1, at block 642, the mobile application 134 may send the authentication response to the authenticator 132, which is received by the authenticator 132 at block 644.

At block 646, the mobile application 134 may generate a session key with RandomA and RandomB.

At block 648, the mobile application 134 may generate a hash for the command data for the encrypted read command set 116, and encrypt the command data with the session key generated at block 646. The encrypted command data may be appended to the hashed data, and sent to the authenticator 132.

At block 650, the authenticator 132 may generate a session key with RandomA1 and RandomB1.

At block 652, the authenticator 132 may decrypt the encrypted command data from block 648 using the session key generated at block 650, with the first 32 bytes being left out.

At block 654, the authenticator 132 may generate a hash of the decrypted data from block 652. For example, the hash may be a 32 byte hash.

At block 656, the authenticator 132 may determine whether the original hash (e.g., the hash from block 648) matches the hash from block 654. The determination at block 656 may be used to effectively confirm that the command data has not been compromised.

In response to a determination that the original hash (e.g., the hash from block 648) does not match the hash from block 654, at block 658, the inquiry for block 604 for the emulated card 104 may be declined.

In response to a determination that the original hash (e.g., the hash from block 648) matches the hash from block 654, at block 660, the inquiry for block 604 for the emulated card 104 may be executed, and the executed inquiry may be received by the emulated card 104 at block 662, where the card data 126 is returned to the authenticator 132.

At block 664, the authenticator 132 may return the received card data from block 662 encrypted with the session key from block 650 to the mobile application 134.

At block 666, the mobile application 134 may generate a signal to display the relevant information and/or results of the inquiry for block 604 to the user 130.

Figure 8:
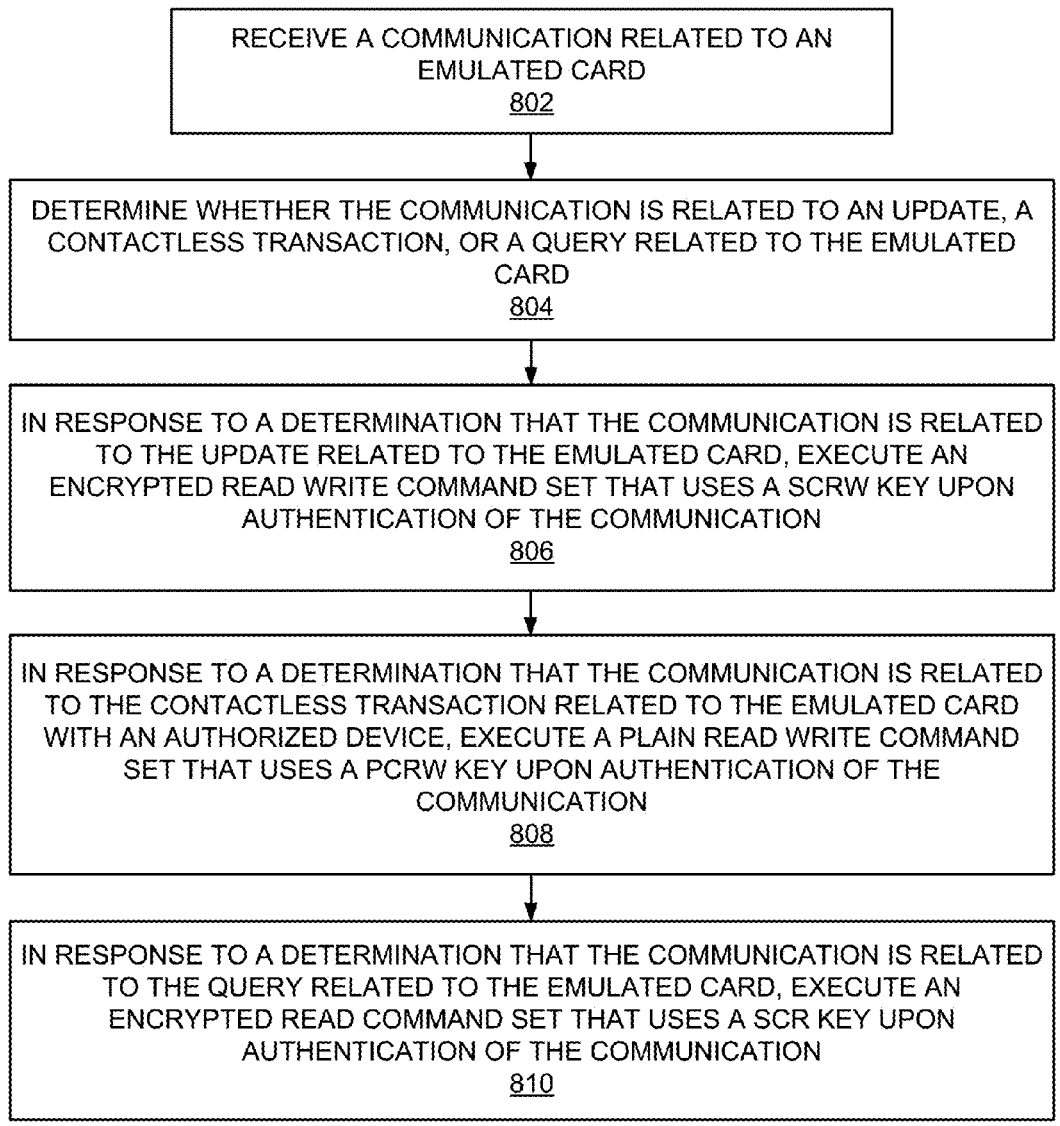
FIG. 8 illustrates further details of the method for remote load and update card emulation support, according to an example of the present disclosure.

FIGS. 7 and 8 illustrate flowcharts of methods 700 and 800 for remote load and update card emulation support, according to examples. The methods 700 and 800 may be implemented on the remote load and update card emulation support apparatus 100 described above with reference to FIGS. 1-6 by way of example and not limitation. The methods 700 and 800 may be practiced in other systems.

Referring to FIGS. 1 and 7, at block 702, the method 700 may include receiving a SCRW key, a PCRW key, and a SCR key that are specific to a device that emulates a card and/or a user of the device. For example, referring to FIG. 1, the secure element 102 may receive the SCRW key 110, the PCRW key 114, and the SCR key 118 that are specific to the mobile device 124 that emulates a card (e.g., the emulated card 104) and/or the user 130 of the mobile device 124.

At block 704, the method 700 may include using the SCRW key, the PCRW key, or the SCR key to provide emulation support for the emulated card by executing a corresponding command set from command sets that include an encrypted read write command set that uses the SCRW key, a plain read write command set that uses the PCRW key, and an encrypted read command set that uses the SCR key. For example, referring to FIG. 1, the SCRW key 110, the PCRW key 114, or the SCR key 118 may be used to provide emulation support for the emulated card 104 by executing a corresponding command set from command sets 106 that include an encrypted read write command set 108 that uses the SCRW key 110, a plain read write command set 112 that uses the PCRW key 114, and an encrypted read command set 116 that uses the SCR key 118.

According to an example, for the method 700, using the SCRW key 110 to provide emulation support for the emulated card 104 by executing the encrypted read write command set 108 that uses the SCRW key 110 may further include encrypting a random key by using the SCRW key 110 (e.g., see block 318 of FIG. 3D), and determining whether an update command related to the emulated card is authentic by comparing (e.g., see block 336 of FIG. 3D) a value of the random key before encryption by using the SCRW key 110 to a value of the random key after the random key has been encrypted by using an authorized entity SCRW key (e.g., SCRW key 322) and further decrypted by using the SCRW key (e.g., see block 334 of FIG. 3D).

According to an example, the method 700 may further include decrypting (e.g., see block 354 of FIG. 3D) encrypted command data for the encrypted read write command set 108 by using a session key (e.g., see block 356 of FIG. 3D) that is generated by keys based on the SCRW key 110. The command data may be encrypted (e.g., see block 352 of FIG. 3B) by using the random key and another random key that is generated by an authorized entity (e.g., the server 136) of the authorized entity SCRW key (e.g., SCRW key 322). The method 700 may further include comparing (e.g., see block 360 of FIG. 3D) a hash of the command data with a hash of the decrypted command data, and in response to a determination that the hash of the command data is equal to the hash of the decrypted command data, executing (e.g., see block 364 of FIG. 3D) the update command related to the emulated card 104.

According to an example, for the method 700, using the PCRW key 114 to provide emulation support for the emulated card 104 by executing the plain read write command set 112 that uses the PCRW key 114 may further include encrypting a random key by using the PCRW key (e.g., see block 516 of FIG. 5C), and determining whether a communication related to the emulated card 104 is authentic by comparing (e.g., see block 534 of FIG. 5C) a value of the random key before encryption by using the PCRW key 114 to a value of the random key after the random key has been encrypted by using an authorized PoS device PCRW key (e.g., PCRW key 520) and further decrypted by using the PCRW key (e.g., see block 532 of FIG. 5C).

According to an example, for the method 700, using the SCR key 118 to provide emulation support for the emulated card 104 by executing the encrypted read command set 116 that uses the SCR key 118 may further include encrypting a random key by using the SCR key (e.g., see block 612 of FIG. 6C), and determining whether a query (e.g., see block 604 of FIG. 6B) related to the emulated card 104 is authentic by comparing (e.g., see block 628 of FIG. 6C) a value of the random key before encryption by using the SCR key 118 to a value of the random key after the random key has been encrypted by using a mobile application based SCR key (e.g., SCR key generated at block 616 of FIG. 6B) and further decrypted (e.g., see block 626 of FIG. 6C) by using the SCR key 118.

According to an example, the method 700 may further include decrypting encrypted command data for the encrypted read command set 116 by using a session key (e.g., see block 650 of FIG. 6C) that is generated by keys based on the SCR key 118. The command data may be encrypted (e.g., see block 648 of FIG. 6B) by using the random key and another random key that is generated by a mobile application 134 of the mobile application based SCR key (e.g., SCR key generated at block 616 of FIG. 6B). The method 700 may further include comparing (e.g., see block 656 of FIG. 6C) a hash of the command data with a hash of the decrypted command data, and in response to a determination that the hash of the command data is equal to the hash of the decrypted command data, executing (e.g., see block 660 of FIG. 6C) the query related to the emulated card 104.

Referring to FIGS. 1 and 8, at block 802, the method 800 may include receiving a communication related to an emulated card. For example, referring to FIG. 1, the secure element 102 may receive a communication related to an emulated card 104.

At block 804, the method 800 may include determining whether the communication is related to an update, a contactless transaction, or a query related to the emulated card. For example, referring to FIG. 1, the authenticator 132 may determine whether the communication is related to an update, a contactless transaction, or a query related to the emulated card 104.

In response to a determination that the communication is related to the update related to the emulated card, at block 806, the method 800 may include executing an encrypted read write command set that uses a SCRW key upon authentication of the communication. For example, referring to FIG. 1, in response to a determination that the communication is related to the update related to the emulated card 104, the secure element 102 may execute an encrypted read write command set 108 that uses a SCRW key 110 upon authentication of the communication by the authenticator 132

In response to a determination that the communication is related to the contactless transaction related to the emulated card with an authorized device, at block 808, the method 800 may include executing a plain read write command set that uses a PCRW key upon authentication of the communication. For example, referring to FIG. 1, in response to a determination that the communication is related to the contactless transaction related to the emulated card 104 with an authorized device (e.g., the PoS device 122), the secure element 102 may execute a plain read write command set 112 that uses a PCRW key 114 upon authentication of the communication by the authenticator 132.

In response to a determination that the communication is related to the query related to the emulated card, at block 810, the method 800 may include executing an encrypted read command set that uses a SCR key upon authentication of the communication. For example, referring to FIG. 1, in response to a determination that the communication is related to the query related to the emulated card 104 the secure element 102 may execute an encrypted read command set 116 that uses a SCR key 118 upon authentication of the communication by the authenticator 132.

According to an example, for the method 800, authentication of the communication with respect to the update related to the emulated card 104 may further include encrypting a random key by using the SCRW key 110 (e.g., see block 318 of FIG. 3D), and determining whether the update related to the emulated card is authentic by comparing (e.g., see block 336 of FIG. 3D) a value of the random key before encryption by using the SCRW key 110 to a value of the random key after the random key has been encrypted by using an authorized entity SCRW key (e.g., SCRW key 322) and further decrypted by using the SCRW key (e.g., see block 334 of FIG. 3D).

According to an example, for the method 800, authentication of the communication with respect to the contactless transaction related to the emulated card 104 may further encrypting a random key by using the PCRW key 114 (e.g., see block 516 of FIG. 5C), and determining whether the contactless transaction related to the emulated card is authentic by comparing (e.g., see block 534 of FIG. 5C) a value of the random key before encryption by using the PCRW key 114 to a value of the random key after the random key has been encrypted by using an authorized device PCRW key (e.g., PCRW key 520) for the authorized device and further decrypted by using the PCRW key (e.g., see block 532 of FIG. 5C).

According to an example, for the method 800, authentication of the communication with respect to the query related to the emulated card may further include encrypting a random key by using the SCR key 118 (e.g., see block 612 of FIG. 6C), and determining whether the query (e.g., see block 604 of FIG. 6B) related to the emulated card is authentic by comparing (e.g., see block 628 of FIG. 6C) a value of the random key before encryption by using the SCR key 118 to a value of the random key after the random key has been encrypted by using a mobile application based SCR key (e.g., SCR key generated at block 616 of FIG. 6B) and further decrypted (e.g., see block 626 of FIG. 6C) by using the SCR key 118.

Figure 9:
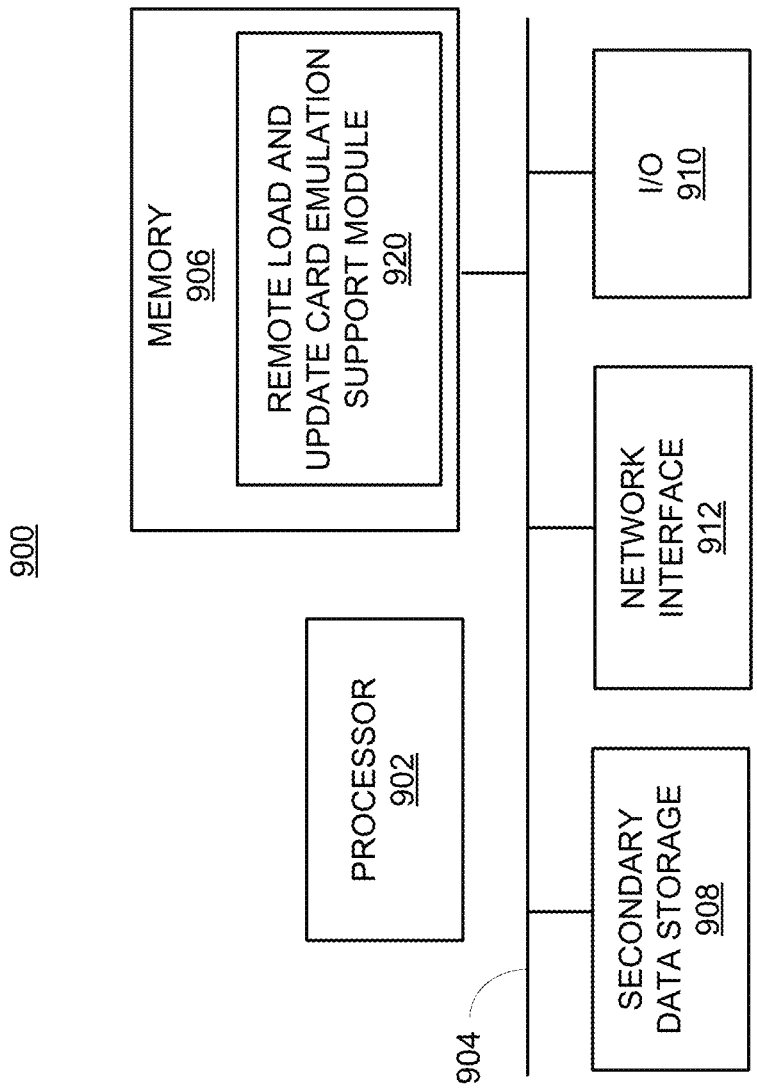
FIG. 9 illustrates a computer system, according to an example of the present disclosure.

FIG. 9 shows a computer system 900 that may be used with the examples described herein. The computer system may represent a generic platform that includes components that may be in a server or another computer system. The computer system 900 may be used as a platform for the apparatus 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include a remote load and update card emulation support module 920 including machine readable instructions residing in the memory 906 during runtime and executed by the processor 902. The remote load and update card emulation support module 920 may include the elements of the apparatus 100 shown in FIG. 1.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A remote load and update card emulation support apparatus comprising:
at least one processor; and
a secure element, executed by the at least one processor,
to ascertain a secure communication read write (SCRW) key, a plain communication read write (PCRW) key, or a secure communication read only (SCR) key to provide emulation support for an emulated card by executing a corresponding command set from command sets that include
an encrypted read write command set that uses the SCRW key by
encrypting a random key by using the SCRW key, and
determining whether an update command related to the emulated card is authentic by comparing a value of the random key before encryption by using the SCRW key to a value of the random key after the random key has been encrypted by using an authorized entity SCRW key and further decrypted by using the SCRW key,
a plain read write command set that uses the PCRW key, and
an encrypted read command set that uses the SCR key.

2. The remote load and update card emulation support apparatus according to claim 1, wherein the secure element is to utilize the encrypted read write command set to implement an update command related to the emulated card.

3. The remote load and update card emulation support apparatus according to claim 2, wherein the secure element is to utilize the encrypted read write command set to implement an update command related to the emulated card by
using the SCRW key to authenticate the update command related to the emulated card.

4. The remote load and update card emulation support apparatus according to claim 1, wherein the secure element is to utilize the plain read write command set to implement near field communication (NFC) based communication with a point of sale (PoS) device.

5. The remote load and update card emulation support apparatus according to claim 4, wherein the secure element is to utilize the plain read write command set to implement NFC based communication with a PoS device by
using the PCRW key to authenticate the communication with the PoS device.

6. The remote load and update card emulation support apparatus according to claim 1, wherein the secure element is to utilize the encrypted read command set to implement a read command related to the emulated card.

7. The remote load and update card emulation support apparatus according to claim 6, wherein the secure element is to utilize the encrypted read command set to implement a read command related to the emulated card by
using the SCR key to authenticate the read command related to the emulated card.

8. The remote load and update card emulation support apparatus according to claim 1, wherein the remote load and update card emulation support apparatus is implemented on a mobile device.

9. The remote load and update card emulation support apparatus according to claim 8, wherein the mobile device includes a mobile phone.

10. A method for remote load and update card emulation support, the method comprising:
receiving a secure communication read write (SCRW) key, a plain communication read write (PCRW) key, and a secure communication read only (SCR) key that are specific to at least one of a device that emulates a card and a user of the device; and
using the SCRW key, the PCRW key, or the SCR key to provide emulation support for the emulated card by executing a corresponding command set from command sets that include
an encrypted read write command set that uses the SCRW key,
a plain read write command set that uses the PCRW key by
encrypting a random key by using the PCRW key, and
determining whether a communication related to the emulated card is authentic by comparing a value of the random key before encryption by using the PCRW key to a value of the random key after the random key has been encrypted by using an authorized point of sale (PoS) device PCRW key and further decrypted by using the PCRW key, and
an encrypted read command set that uses the SCR key.

11. The method according to claim 10, wherein using the SCRW key to provide emulation support for the emulated card by executing the encrypted read write command set that uses the SCRW key further comprises:
encrypting the random key by using the SCRW key; and
determining whether an update command related to the emulated card is authentic by comparing a value of the random key before encryption by using the SCRW key to a value of the random key after the random key has been encrypted by using an authorized entity SCRW key and further decrypted by using the SCRW key.

12. The method according to claim 11, further comprising:
decrypting encrypted command data for the encrypted read write command set by using a session key that is generated by keys based on the SCRW key, wherein the command data is encrypted by using the random key and another random key that is generated by an authorized entity of the authorized entity SCRW key;
comparing a hash of the command data with a hash of the decrypted command data; and
in response to a determination that the hash of the command data is equal to the hash of the decrypted command data, executing the update command related to the emulated card.

13. The method according to claim 10, wherein using the SCR key to provide emulation support for the emulated card by executing the encrypted read command set that uses the SCR key further comprises:
encrypting the random key by using the SCR key; and
determining whether a query related to the emulated card is authentic by comparing a value of the random key before encryption by using the SCR key to a value of the random key after the random key has been encrypted by using a mobile application based SCR key and further decrypted by using the SCR key.

14. The method according to claim 13, further comprising:
decrypting encrypted command data for the encrypted read command set by using a session key that is generated by keys based on the SCR key, wherein the command data is encrypted by using the random key and another random key that is generated by a mobile application of the mobile application based SCR key;
comparing a hash of the command data with a hash of the decrypted command data; and
in response to a determination that the hash of the command data is equal to the hash of the decrypted command data, executing the query related to the emulated card.

15. A non-transitory computer readable medium having stored thereon machine readable instructions for remote load and update card emulation support, the machine readable instructions when executed cause a processor to:
receive a communication related to an emulated card;
determine whether the communication is related to an update, a contactless transaction, or a query related to the emulated card;
in response to a determination that the communication is related to the update related to the emulated card, execute an encrypted read write command set that uses a secure communication read write (SCRW) key upon authentication of the communication by
encrypting a random key by using the SCRW key, and
determining whether the update related to the emulated card is authentic by comparing a value of the random key before encryption by using the SCRW key to a value of the random key after the random key has been encrypted by using an authorized entity SCRW key and further decrypted by using the SCRW key;
in response to a determination that the communication is related to the contactless transaction related to the emulated card with an authorized device, execute a plain read write command set that uses a plain communication read write (PCRW) key upon authentication of the communication; and
in response to a determination that the communication is related to the query related to the emulated card, execute an encrypted read command set that uses a secure communication read only (SCR) key upon authentication of the communication.

16. The non-transitory computer readable medium of claim 15, wherein the authorized device is a point of sale (PoS) device.

17. The non-transitory computer readable medium of claim 15, wherein authentication of the communication with respect to the contactless transaction related to the emulated card further comprises:
encrypting the random key by using the PCRW key; and
determining whether the contactless transaction related to the emulated card is authentic by comparing the value of the random key before encryption by using the PCRW key to a value of the random key after the random key has been encrypted by using an authorized device PCRW key for the authorized device and further decrypted by using the PCRW key.

18. The non-transitory computer readable medium of claim 15, wherein authentication of the communication with respect to the query related to the emulated card further comprises:
encrypting the random key by using the SCR key; and
determining whether the query related to the emulated card is authentic by comparing the value of the random key before encryption by using the SCR key to a value of the random key after the random key has been encrypted by using a mobile application based SCR key and further decrypted by using the SCR key.

* * * * *